J. I. HULL.
REACTANCE SHUNT FOR COMMUTATOR MACHINES.
APPLICATION FILED JULY 18, 1916.

1,328,519.

Patented Jan. 20, 1920.

Inventor:
John I. Hull,
by Albert H. Davis
His Attorney.

UNITED STATES PATENT OFFICE.

JOHN I. HULL, OF SCHENECTADY, NEW YORK, ASSIGNOR TO GENERAL ELECTRIC COMPANY, A CORPORATION OF NEW YORK.

REACTANCE-SHUNT FOR COMMUTATOR-MACHINES.

1,328,519.     Specification of Letters Patent.     Patented Jan. 20, 1920.

Application filed July 18, 1916. Serial No. 109,990.

*To all whom it may concern:*

Be it known that I, JOHN I. HULL, a citizen of the United States, residing at Schenectady, in the county of Schenectady, State of New York, have invented certain new and useful Improvements in Reactance-Shunts for Commutator-Machines, of which the following is a specification.

My invention relates to shunt connected commutator machines adapted to be operated by alternating currents and particularly to systems for the speed control of induction motors in which such machines are employed. My invention has for its object to avoid certain difficulties which have arisen in the operation of such machines and systems, and particularly to minimize the flow of harmful currents which I have discovered are caused by self-excitation of the commutator machine.

Shunt-connected alternating current commutator machines are being extensively applied to the speed control of induction motors, and in such an application it has been found that there is sometimes a tendency during a certain portion of the operation for the commutator machine to self-excite. The axis of the flux which would be induced by currents in the exciting winding due to rotation tension resulting from a persistence of any instantaneous value of flux in the machine, however, may not coincide with that of the flux in the machine, and if such is the case a rotating field will be set up which will produce currents of a frequency which is usually lower than the normal frequency of the machine at this period of the operation. The practical result of this phenomena is to cause excessive currents which not only disturb the desired operation, but may become magnified to such an extent that they are dangerous.

In accordance with my invention I provide means which will prevent low frequency self-excitation of commutator machines in general, and especially of such machines when they are combined with induction motors, and therefore to avoid the difficulties which have been encountered. I find that a winding of low resistance and high inductance connected in shunt to the exciting winding of the commutator machine in question will be effective for this purpose.

Figure 1:
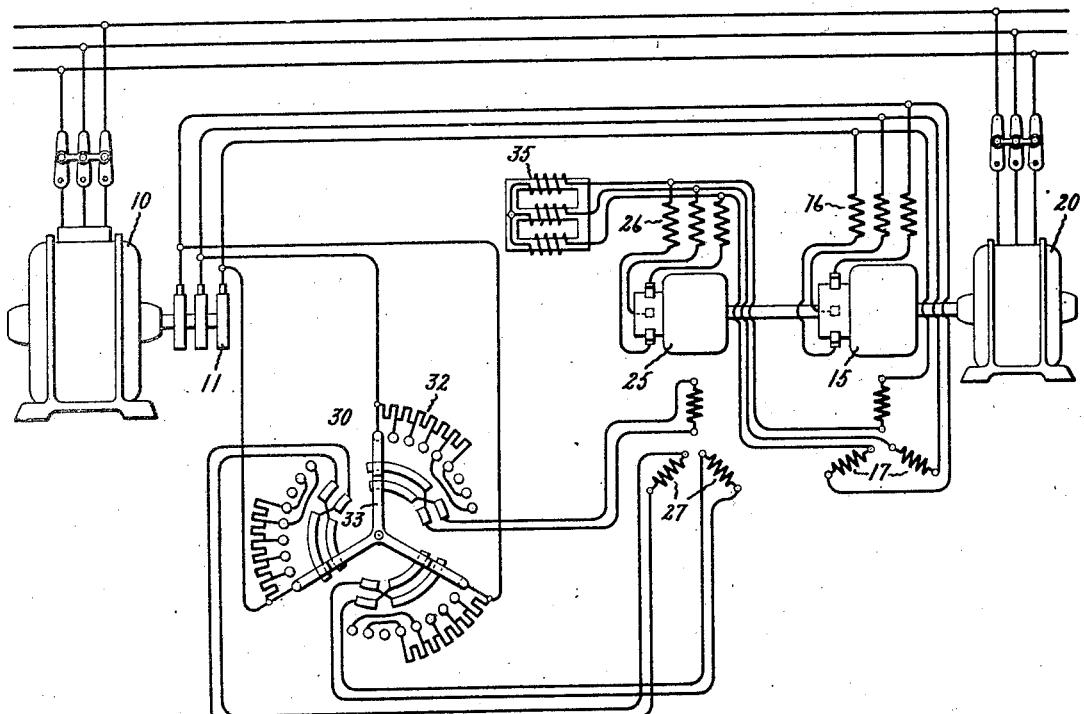

The problem which has been encountered, and my solution of the same, will be more readily understood from the following specification, when taken in connection with the accompanying drawing, in which: Figure 1 shows my reactance shunt applied in a system arranged for controlling the speed of an induction motor; Figs. 2, 3, 4, and 5 are explanatory diagrams.

My invention may be best explained by considering its application in a concrete system. For this reason I have illustrated the same as applied to the exciter used to control the excitation of a commutator machine which is concatenated with an induction motor whose speed it is desired to control. In Fig. 1, the primary winding of the induction motor 10 may be supplied with current from any suitable source. Its secondary winding, here shown as mounted upon the rotor and connected to the slip rings 11, will be connected in cascade with a commutator regulating machine 15, which may be arranged in various ways but is here shown as forming part of a so-called regulating set. This regulating set will commonly comprise an induction machine 20 and a commutator exciter 25 mounted to rotate in unison with the regulating machine 15. The primary winding of the induction machine 20 is connected to the source of supply through a suitable disconnecting switch. Connected in series between the brushes of the regulating machine 15 and the slip rings 11, are the usual compensating windings 16, while the flux in the regulating machine is determined by means of exciting windings 17 which will preferably be connected in series between the slip rings 11 and the brushes of the commutator exciter 25. The exciter is also provided with a compensating winding 26 and an exciting winding 27. This latter winding is connected to the secondary terminals of the main induction motor through an exciter field rheostat 30, by means of which the speed of the induction motor 10 may be controlled. As a result the winding 27 is electrically connected in shunt to the terminals of the exciter 25. Each phase of the winding 27 has its terminals connected to suitable contact segments 31 on the rheostat by means of which one or the other terminal of each of said windings may be connected to the resistances 32, each of which has one terminal connected to the slip rings 11. It will be noted that the outer ends of the operating arm 33 of the rheostat are insulated from the inner part and are arranged to connect the outer row of segments to various points of the resistances 32, while the central portion of the operating arm forms a Y-point for the windings 27. Connected in shunt with the main terminals of the commutator exciter is the reactance shunt 35 to which I have referred. This shunt will preferably be designed with a very low resistance and a comparatively high inductance.

As is already well understood in the art, and as has been explained in the German Patent #241,188, the size of the exciter 25 is greatly reduced by connecting the exciting winding 17 in series between the secondary terminals of the main induction motor and the terminals of the exciter. The secondary voltage of the main induction motor is approximately correct for the desired excitation of the regulating machine 15, and with the arrangement herein illustrated, it is only necessary for the commutator exciter 25 to supply the difference between the secondary voltage and the voltage which it is desired to apply to the exciting windings 17. It will accordingly be connected to either oppose or aid the secondary voltage as the conditions may require.

Figure 5:
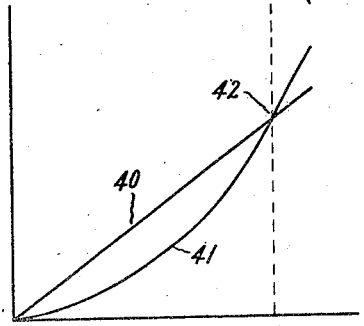

This will be readily seen by reference to curves 40 and 41 in Fig. 5. The abscissæ of these curves as well as of those in Fig. 4 may be taken as the percentage of the total range of speed regulation, synchronous speed being located at the origin. The curve 40 represents the variations of secondary voltage with variations of speed of the main induction motor, while the parabolic curve 41 represents the voltages which it is desired to apply to the terminals of the exciting winding 17. During the part of the operation between synchronous speed and the crossing point 42 of the two curves, the exciter voltage will oppose the secondary voltage, while during the operation beyond this point, the exciter voltage will be added to the secondary voltage. It follows that the resistance of the exciter field rheostat 30 must vary in accordance with the curves 43 and 44 in order to secure this result, so that at a speed corresponding to the point 42 the resistance is infinite, while at speeds approaching synchronism the resistance is comparatively small. It may readily be shown that the variation of the exciter terminal voltage is correctly represented by the curve 45 while the ratio of exciter terminal voltage to slip frequency, which is also the frequency of the exciter, will be represented by curve 46.

Figures 2, 3:
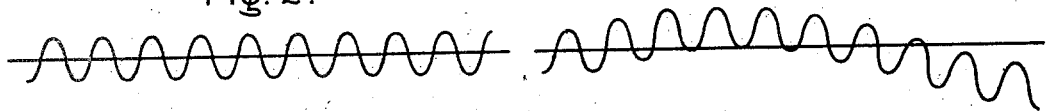
Figure 4:
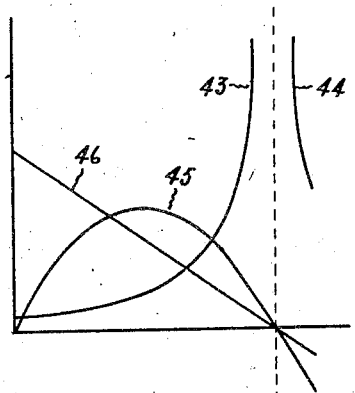

For the self excitation of shunt-excited direct-current machines, it is necessary that the existing flux at any time shall produce a terminal voltage which is large enough to force a current through the field circuit which will either maintain or increase this flux. Similarly, with alternating-current commutator machines there are certain conditions precedent to self-excitation which are, however, somewhat more complicated than with direct current machines. It will be noted by an inspection of the curves and figures, that in the neighborhood of synchronism the exciter voltage has a very considerable magnitude which moreover is not much less than the secondary voltage of the main induction motor. Further, the ohmic resistance of the rheostat 30 in the exciter field circuit is comparatively small during this part of the range, and the ratio of the exciter volts to frequency, as shown by curve 46, is large. All of these conditions, therefore, are favorable for self-excitation of the machine 25. As has been previously intimated, a rotating self-exciting field may be set up in the exciter 25 due to its own tendencies toward self-excitation as possibly enhanced and magnified by the inter-connections and interactions of the several machines, so that the final superimposed current at the primary and secondary terminals of the induction motor may be very considerable, and may easily become dangerous. Oscillograph records of the secondary current of the induction motor where this phenomenon is occurring show the existence of very low frequency currents which are superimposed upon the characteristic or normal frequency in the circuit. This effect is illustrated in Fig. 3.

It will be readily understood that if a short circuit having absolutely no resistance could be placed across the terminals of a self-excited direct-current machine, the machine would be unable to maintain any terminal voltage and therefore could not self-excite. I have accordingly conceived that a similar effect may be obtained in the case of the commutator machine 25 by placing a reactance shunt 35 across its terminals which shall have a very small resistance and a large inductance. As the slip frequency is comparatively large even as near synchronism as it is ordinarily required to operate the reactance of this shunt will be sufficiently great to prevent any appreciable currents of the working frequency from being diverted therein. If self-excitation of low frequency, however, tends to set in, this shunt will have a comparatively small reactance for such low frequency currents and so will act more like a pure resistance tending to short-circuit the exciter as far as the self-excitation low frequency currents are concerned. The practical result of this is shown by the oscillograph curve in Fig. 2 of the induction motor secondary current, from which it will be seen that the disturbing low frequency currents have been eliminated.

It will accordingly be seen that I have devised a very simple arrangement which may be permanently connected in circuit and which will practically eliminate all low frequency disturbances in the circuit of the exciter 25. It should be further noted that my arrangement is doubly effective because of the fact that the flux in the core of the reactance 35 will increase in the neighborhood of synchronism where the conditions are the most favorable toward self excitation because of the increase of the ratio of exciter terminal voltage and frequency as shown by curve 46. There will therefore be a tendency toward saturation at this point which will automatically divert a larger current and make the shunt more effective in preventing self-excitation. On the other hand, at the normal running speeds, this tendency toward saturation will not be present and the character of the shunt as a reactance will be all the more pronounced.

Although I have herein illustrated one particular embodiment of my invention as applied to a commutator machine used for regulating the speed of an induction motor, it will be evident that it is in nowise so limited, and that I seek to cover in the appended claims all those modifications and variations which come within the true scope and spirit of my invention. It will also be obvious to those skilled in the art that my invention is equally applicable to commutator machines of any number of phases and to any arrangement of such machines where their exciting windings are connected in shunt with their brushes.

What I claim as new and desire to secure by Letters Patent of the United States, is:—

1. In combination, a commutator machine, an exciting winding therefor connected in shunt to the terminals of said machine, and means connected in shunt to said exciting winding for preventing low frequency self-excitation of said machine.

2. In combination, a commutator machine, an exciter winding therefor connected in shunt to the terminals of said machine, and means connected in shunt to said exciting winding for preventing self excitation at low frequencies which become ineffective at relatively high frequencies.

3. In combination, a commutator machine, an exciting winding therefor connected in shunt to the terminals of said machine, and a high inductance low resistance shunt connected around said exciting winding for preventing self-excitation of said machine.

4. In combination, a commutator machine, an exciting winding therefor connected to the terminals of said machine, means connected to and adapted to separately excite said exciting winding, and means connected in shunt to said exciting winding for preventing low frequency self-excitation of said machine.

5. In combination, an induction motor, a commutator regulating machine concatenated therewith, a commutator exciter for said regulating machine, exciting windings for said regulating machine connected between the secondary terminals of said motor and the terminals of said exciter, an exciting winding for said exciter connected in shunt to the secondary terminals of said motor, and means for preventing low frequency self excitation of said exciter especially when the speed of said motor is near synchronism.

6. In combination, an induction motor, a commutator regulating machine concatenated therewith, a commutator exciter for said regulating machine, exciting windings for said regulating machine connected between the secondary terminals of said motor and the terminals of said exciter, an exciting winding for said exciter connected in shunt to the secondary terminals of said motor, and a high inductance, low resistance shunt for the terminals of said commutator exciter.

In witness whereof, I have hereunto set my hand this 17th day of July, 1916.

JOHN I. HULL.